UNITED STATES PATENT OFFICE.

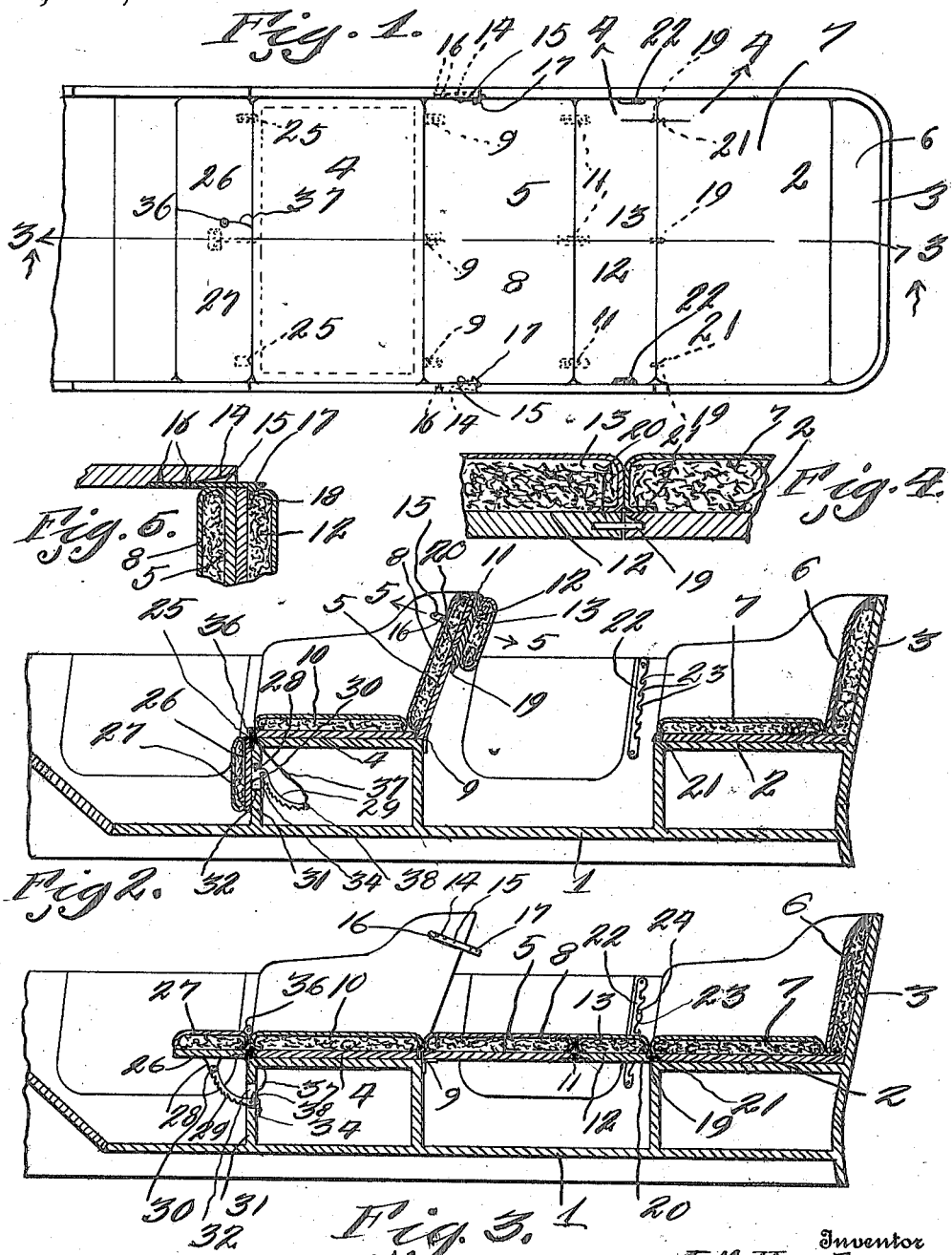
J. M. HUGHES.
MOTOR VEHICLE BODY.
APPLICATION FILED OCT. 7, 1915.
1,208,319. Patented Dec. 12, 1916.

JULIAN M. HUGHES, OF PERU, INDIANA.

MOTOR-VEHICLE BODY.

1,208,319.  Specification of Letters Patent.  Patented Dec. 12, 1916.

Application filed October 7, 1915. Serial No. 54,528.

*To all whom it may concern:*

Be it known that I, JULIAN M. HUGHES, a citizen of the United States, residing at Peru, in the county of Miami, State of Indiana, have invented a new and useful Motor-Vehicle Body; and I do hereby declare the following to be a full, clear, and exact description of the invention, such as will enable others skilled in the art to which it appertains to make and use the same.

This invention relates to motor vehicles, particularly touring cars, and more especially to the body, and which is provided with particularly constructed seats, convertible into a sleeping bunk for the passengers.

One of the objects of the invention is to provide especially constructed seats, in which improved, efficient and practical detail features are involved, whereby the seats may be converted into a sleeping bunk.

One of the features of the invention is to provide a foot support adjustable to different positions, and which support when not in use as a support, is locked in its lowered position.

Another feature of the invention is the provision of means whereby the back of the front seat may be adjusted in different inclined positions, whereby the passengers in the front seat may assume reclining positions, for instance, similar to positions that a person may assume in a Morris chair or the like.

Another feature of the invention is the provision of an extension hinged to the upper edge portion of the back of the front seat, and designed, when the back of the front seat is lowered, to engage the upper front portion of the rear seat, so as to provide a sleeping bunk.

In practical fields the details of construction may necessitate alterations, falling within the scope of what is claimed.

The invention comprises further features and combination of parts, as hereinafter set forth, shown in the drawings and claimed.

In the drawings, Figure 1 is a plan view of the body of the vehicle, showing the back and the foot support of the front seat arranged to afford a sleeping bunk. Fig. 2 is a longitudinal sectional view through the body of the vehicle, showing the back and the foot support of the front seat arranged so that the passengers may sit in an upright position. Fig. 3 is a longitudinal sectional view on line 3—3 of Fig. 1. Fig. 4 is an enlarged detail sectional view of a portion of the hinged section of the back of the front seat, and a front portion of the rear seat, showing the connection between the hinged section and the rear seat. Fig. 5 is a sectional view on line 5—5 of Fig. 2, showing the means for supporting the back of the front seat and its hinged section in such position that the front seat may be used in the ordinary manner.

Referring more especially to the drawings, 1 designates the frame of the body, which is provided with a rear seat 2 having its back 3, and a front seat 4 having a back 5. The back 3 of the rear seat is stationary and is provided with the usual cushion 6. The seat 2 has a cushion 7. The back 5 of the front seat has a cushion 8, and is hingedly connected at 9 to the rear upper corner of the front seat, which front seat 4 has the usual cushion 10. Suitably hinged at 11 to the upper edge portion of the back 5 of the front seat is a back section 12 having a cushion 13. At directly opposite points of the opposite sides of the front seat and adjacent the opposite ends of the back 5 recesses 14 are provided, in which spring catches 15 are fixed at 16, so that when the section 12 is collapsed against the rear of the back 5, and the back 5 raised from the position shown in Fig. 3 to the position shown in Fig. 2, the adjacent opposite edges of the back and the section 12 will slide upon the inclined surfaces 17, until the opposite edge portions of the section 12 engage the shoulders 18 of said spring catches, thereby supporting the back 5 and the back section 12 in the position shown in Fig. 2. However, when it is desired to arrange the back 5 of the front seat so as to provide a sleeping bunk, the back 5 and the section 12 are released from their positions in Fig. 2 (the section 12 swung upon its hinge connections to an extended position) and lowered to the positions shown in Fig. 3, so that the lugs 19 upon the edge portions 20 of the section 12 will engage the sockets 21 of the upper front portion of the rear seat. It is to be observed that the back 5 and the section 12 are hinged together so as to prevent them from collapsing, when in their lowered positions, as disclosed in Fig. 3. Upon the inner faces of the sides of the body and directly opposite each other are elongated metal strips 22 having a plurality of notches 23, and in any two opposite notches 23 of said strips 22 a rod 24 may be arranged, upon which rod the section 12 may be supported, thereby holding the back 5 and the section 12 in inclined position, so that a passenger may be supported, as if in the Morris chair or the like. Hinged at 25 to the forward upper portion of the front seat 4 is a foot support 26 having a cushion 27. This foot support hangs normally in the position shown in Fig. 2, and projecting from its rear or under face is a pair of ears 28, between which a segment rack 29 is pivoted at 30. The front wall 31 of the front seat 4 has an opening 32, through which the ears 28 project, when the foot support 26 is lowered as in Fig. 2. Fixed to the rear face of the part 31 of the front seat 4 is a plate 34, which partially overlies the opening 32 in such a manner that when the foot support is raised to the position shown in Fig. 3 the teeth of the rack 29 will work over the upper edge of the plate 34, until the free end of the rack engages in front of the plate 34, thereby supporting the foot support in a raised position as in Fig. 3. However, any one of the teeth of the rack 29 may engage the plate 34, so as to hold the foot support in adjusted position. When the foot support or section 26 is lowered as in Fig. 2, the segment rack hangs downwardly as in Fig. 2, partially in the path of a plate 34, and owing to its weight the foot support or section 26 is held as suspended downwardly, and against being raised. However, when it is desired to raise the section or foot support 26, the rack 29 may be partially lifted, by grasping the ring 36 of the cord 37, which in turn is connected at 38 to the free end of the rack, and pulling upon the cord. After the rack is raised upwardly sufficiently the foot support or section 26 may be raised. When the back 5 and the section 12 and the section 26 or foot support are arranged as shown in Fig. 3 a suitable bunk or sleeping quarter for the passengers of the car is provided.

The invention having been set forth, what is claimed as new and useful is:—

In combination with a vehicle body, of a seat mounted on said body, a foot support hingedly connected to the forward upper portion of the seat, an opening in the front wall of the seat, a plate secured to the inner surface of the front wall and partially overlying said opening, the rear or under surface of the foot support having a pair of ears protruding through said opening and beyond said plate, a segment ratchet bar pivoted between the ears and designed, when the support is lowered, to suspend or hang downwardly, whereby a portion of said ratchet bar will abut the rear face of said plate, which is in the path of the bar, thereby preventing accidental raising of the support, means connected to the free end of the bar to partially raise the same, whereby the support may be raised to adjusted positions, the teeth coöperating with the plate to hold the support raised, the free end of the bar coöperating with the lower edge of the opening and abutting the front face of the plate, thereby constituting means to hold the support in a horizontal position.

In testimony whereof I have signed my name to this specification in the presence of two subscribing witnesses.

JULIAN M. HUGHES.

Witnesses:
J. B. CARR,
P. J. HARTMAN.

Copies of this patent may be obtained for five cents each, by addressing the "Commissioner of Patents, Washington, D. C."